US012558872B2

(12) United States Patent
Odum et al.

(10) Patent No.: US 12,558,872 B2
(45) Date of Patent: *Feb. 24, 2026

(54) COMPOSITE STRUCTURE FOR APPLYING TILES TO A SURFACE, AND SYSTEMS AND METHODS OF USING SAME

(71) Applicant: COLUMBIA INSURANCE COMPANY, Omaha, NE (US)

(72) Inventors: Thomas Odum, Tunnel Hill, GA (US); James Burns, Rocky Face, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/999,899

(22) Filed: Dec. 23, 2024

(65) Prior Publication Data

US 2025/0121585 A1 Apr. 17, 2025

Related U.S. Application Data

(63) Continuation of application No. 16/787,694, filed on Feb. 11, 2020, now Pat. No. 12,179,457.

(Continued)

(51) Int. Cl.
| | |
|---|---|
| *B32B 13/02* | (2006.01) |
| *B32B 5/02* | (2006.01) |
| *B32B 7/12* | (2006.01) |
| *B32B 13/04* | (2006.01) |
| *B32B 37/10* | (2006.01) |
| *C04B 7/02* | (2006.01) |
| *C04B 11/00* | (2006.01) |
| *C04B 20/00* | (2006.01) |
| *E04F 15/02* | (2006.01) |
| *C04B 111/60* | (2006.01) |

(52) U.S. Cl.
CPC .............. *B32B 13/04* (2013.01); *B32B 5/022* (2013.01); *B32B 5/024* (2013.01); *B32B 5/026* (2013.01); *B32B 7/12* (2013.01); *B32B 13/02* (2013.01); *B32B 37/10* (2013.01); *C04B 7/02* (2013.01); *C04B 11/00* (2013.01); *C04B 20/0048* (2013.01); *E04F 15/02155* (2013.01); *B32B 2260/021* (2013.01); *B32B 2260/044* (2013.01); *B32B 2419/04* (2013.01); *C04B 2111/60* (2013.01)

(58) Field of Classification Search
CPC ......... B32B 13/04; B32B 5/024; B32B 5/026; B32B 7/12; B32B 37/10; B32B 13/02; B32B 5/022; C04B 7/02; C04B 11/00; C04B 20/0048; C04F 15/02155
USPC ........................................ 428/220
See application file for complete search history.

(56) References Cited

U.S. PATENT DOCUMENTS

| | | | | |
|---|---|---|---|---|
| 5,198,277 A | * | 3/1993 | Hamilton | ................... B32B 7/12 |
| | | | | 428/95 |
| 5,209,968 A | * | 5/1993 | Sweeney | ................... E04C 2/16 |
| | | | | 264/257 |

(Continued)

*Primary Examiner* — Tahseen Khan
(74) *Attorney, Agent, or Firm* — Ballard Spahr LLP

(57) ABSTRACT

A composite structure for use in tiling surfaces is disclosed. The composite structure can include a fiber matrix impregnated with a water-activated setting material. The composite structure can be wet and then compressed between a tile and an application surface. The composite structure can cure to provide a support surface for the tile.

20 Claims, 5 Drawing Sheets

Related U.S. Application Data

(60) Provisional application No. 62/803,980, filed on Feb. 11, 2019.

(56) References Cited

U.S. PATENT DOCUMENTS

| | | | | |
|---|---|---|---|---|
| 6,129,967 | A * | 10/2000 | Young | B32B 9/043 |
| | | | | 52/391 |
| 2006/0063458 | A1 * | 3/2006 | McGuire | D04H 1/70 |
| | | | | 442/361 |
| 2009/0117804 | A1 * | 5/2009 | Emirze | D04H 3/10 |
| | | | | 442/364 |
| 2010/0212690 | A1 * | 8/2010 | Linden | A47L 11/4038 |
| | | | | 15/98 |
| 2018/0250910 | A1 * | 9/2018 | Lunsford | B32B 27/06 |

* cited by examiner

COMPOSITE STRUCTURE FOR APPLYING TILES TO A SURFACE, AND SYSTEMS AND METHODS OF USING SAME

CROSS-REFERENCE TO RELATED APPLICATION

This application is a continuation of U.S. patent application Ser. No. 16/787,694, filed Feb. 11, 2020, which claims priority to and the benefit of U.S. Provisional Patent Application No. 62/803,980, filed Feb. 11, 2019, the entirety of each of which is hereby incorporated by reference herein.

FIELD

This application relates generally to systems, materials, and methods for laying tiles and, specifically, for providing a composite structure between the tiles and an application surface.

BACKGROUND

Conventionally, ceramic tiles require a uniform backing support area to engage and distribute loads across the tile's back surface area. Typically, this requires a professional tile installer to spread a thinset mortar layer. The tile installer uses a trowel to create ridges and valleys so that, when the tile is installed, the ridges can collapse into the valleys to conform to the tile's back surface. Not only can this be expensive, but, when done improperly, this can lead to poorly supported tiles that can stress and crack. Moreover, the conventional method binds the tiles to the application surface, making it difficult to remove the tiles and mortar if desired. Often, the thinset mortar layers of such tiles can only be removed through the use of a jackhammer. Thus, ceramic tiles are conventionally viewed as a permanent flooring structure that is not conducive to periodic modifications, substitutions, or replacements.

SUMMARY

Disclosed herein, in one aspect, is a composite structure for applying a tile to a selected surface. The composite structure can have respective upper and lower surfaces. The composite structure can comprise a fiber matrix and a water-activated setting material. The fiber matrix can be impregnated with the water-activated setting material. The composite structure can be deformable prior to setting of the water-activated setting material so that the bottom surface of the composite structure conforms to an underlying application surface.

The composite structure can have an uncompressed thickness between two millimeters and twenty millimeters.

The fiber matrix can comprise a nonwoven material.

The nonwoven material can comprise a nonwoven batt comprising fibers having a denier ranging from 4 to 150. The fibers can be positioned in an open pattern.

The fiber matrix can comprise fibers in a velour pattern.

The fiber matrix can comprise at least one of a melamine sponge, a three-dimensional spunbond, a three-dimensional woven fabric, or a three-dimensional knitted fabric.

The water-activated setting material can comprise Portland cement or gypsum.

The water-activated setting material can be configured to set within five to ninety minutes of application of water to the water-activated setting material.

The composite structure can be deformable by at least 25-50% of its uncompressed thickness.

According to another aspect, a tile assembly can comprise a tile, defining a top surface and a bottom surface, and a composite structure. The upper surface of the composite structure can attach to the bottom surface of the tile.

The tile can be a ceramic tile.

The tile assembly can further comprise a hot-melt glue that bonds the tile to the composite structure.

According to another aspect, a method of forming a finished flooring surface can comprise wetting the composite structure of the tile assembly and pressing the tile assembly against an underlying application surface.

The application surface can have a variable surface profile. The composite structure can conform to the variable surface profile of the application surface.

The application surface can be a subfloor.

The composite structure can be attached to the tile prior to wetting of the composite structure.

The composite structure can be unattached to the tile prior to wetting of the composite structure. The method can further comprise compressing the wet composite structure between the tile of the tile assembly and the application surface prior to setting of the water-activated setting material of the composite structure.

The method can further comprise allowing the water-activated setting material of the composite structure to set, detaching the tile assembly from the underlying application surface, wetting a composite structure of a replacement tile assembly, and securing the replacement tile assembly to the underlying application surface.

A flooring surface can be created according to the methods disclosed herein.

The tile assembly can be attached to the application surface by a bond having a separation force per square inch that is less than twenty pounds of force per square inch.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
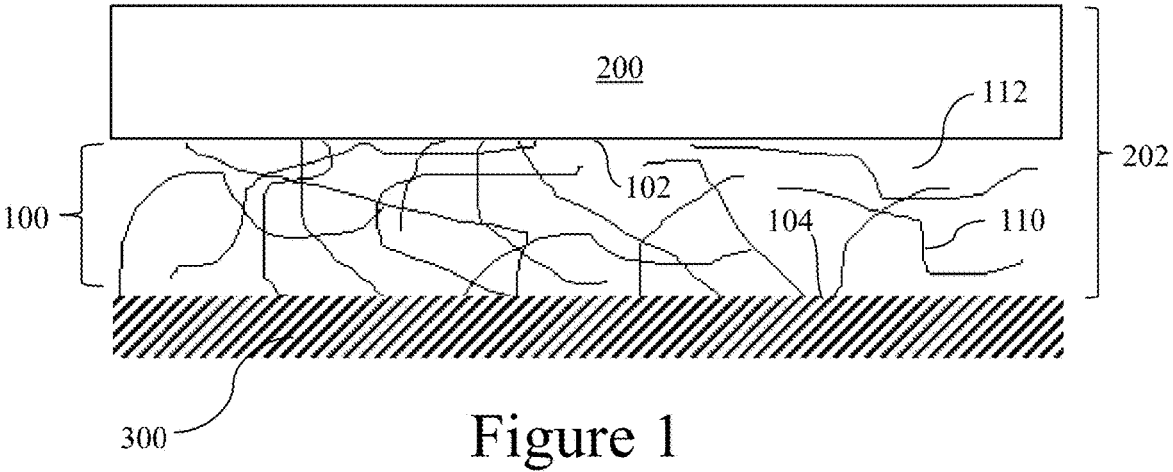
FIG. 1 is a schematic of a tiled surface using a composite structure as disclosed herein.

The disclosed system and method may be understood more readily by reference to the following detailed description of particular embodiments and the examples included therein and to the Figures and their previous and following description.

A. Definitions

It is to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a tile" includes a plurality of such tiles, and reference to "the tile" is a reference to one or more tiles and equivalents thereof known to those skilled in the art, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

As used herein, the term "tile" refers to any conventional modular tile, including, for example and without limitation, resilient and/or vinyl flooring tiles, carpet flooring tiles, ceramic flooring tiles, ceramic wall tiles, and ceiling tiles.

The term "fiber" as used herein includes fibers of extreme or indefinite length (i.e. filaments) and fibers of short length (i.e., staple fibers).

As used herein, the term "nonwoven material" refers to materials made from staple fibers and/or long fibers, bonded together by any means known in the art. In some exemplary aspects, the fibers of nonwoven materials can be bonded by chemical, mechanical, heat or a solvent treatment. In other exemplary aspects, the nonwoven materials can be densified or reinforced.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

B. Composite Structure for Tile Application

Disclosed herein is a composite structure for use in applying one or more tiles to a surface, such as, for example, a floor, a subfloor, a wall, a ceiling, or other hard surface. As used herein, the term "application surface" refers to the surface to which one or more tiles are applied using the disclosed composite structure.

Referring to FIGS. 1-4, the composite structure 100 can have a top surface 102 and a bottom surface 104. The composite structure 100 can comprise a fiber matrix 110. The fiber matrix can include, for example, a nonwoven material. According to one aspect, the nonwoven material can include a nonwoven batt. Optionally, in this aspect, the nonwoven fiber batt can be formed from gravitationally laid fibers. In still further aspects, the nonwoven fiber batt can comprise fibers that are mechanically bonded. In yet other aspects, the fiber batt comprises fibers that are thermally bonded. In certain aspects, the batt can be formed by gravitationally laying fibers and mechanically interlocking the fibers. In still further aspects, the batt is semi-permeable. In still further aspects, the batt is impermeable.

In some aspects, the nonwoven fiber batt does not comprise any additional binders or adhesives that are used to lock the fibers in the fiber batt. In such aspects, the terms "additional binders or adhesives" denotes binders or adhesives which are not part of, or inherent in, the fibers of the fiber batt. In yet other aspects, the arrangement and contact of the fibers can lock the fibers in position by mechanisms comprising physical entangling of the fibers, friction between fibers and/or inherent bonding of fibers. In such aspects, the term "inherent bonding of fibers" denotes bonding which relies upon the properties of the fibers, rather than on additional bonding or binding materials. For example, and without limitation, the adhesion between fibers can be regarded as being an inherent bonding if they adhere due to a heat (and/or pressure) treatment which allows them to adhere together due to the properties of the fibers, but should not be regarded as being bonded by inherent bonding of the fibers if they are adhered by a resin or other bonding material which is not part of the fibers. It should be regarded that contact between fibers is intended to include contact at regions where fibers are fused or welded together, so that fused or welded (but still distinguishable) fibers are considered to have contact therebetween.

In certain aspects, the fiber batt can be formed by utilizing a card and cross lapping system, an airlay system, or a combination thereof. It is understood that in some aspects, after the fibers are gravitationally laid, the formed fiber batt can further be needlepunched. In still further aspects, the formed fiber batt can further be heat and pressure treated to further densify the batt.

Optionally, the fibers of the fiber matrix can be positioned in an open pattern. That is, the fibers can be arranged in a pattern that defines voids. According to some embodiments, the voids can be filled with adhesive thinset materials. According to further aspects, the fiber matrix can comprise a velour pattern as is known in the art. That is, the fiber matrix can comprise a plush non-woven fabric which resembles velvet but has a higher nap. In these aspects, it is contemplated that the velour pattern can be configured to retain more gypsum (or other water-activated setting material) than other fiber matrix patterns disclosed herein. In still another embodiment, it is contemplated that the fiber matrix can comprise an expanding polyurethane foam.

Optionally, in other exemplary aspects, the fiber matrix can comprise a nonwoven or woven mat.

In yet other aspects, the fibers of the fiber matrix can comprise any fibers that are known in the art. In certain aspects, the fibers are polymeric fibers. In yet other aspects, the fibers are natural fibers. In still other aspects, the fibers are bio-degradable fibers. In certain aspects, the fibers are degradable fibers. In still further aspects, the fibers can comprise polyester fibers, polyolefin fibers, polyamide fibers, polyurethane fibers, acrylic fibers, or any other fibers known in the art. In some aspects, the fibers of the fiber matrix can comprise at least one of nylon, polyester, polyethylene, and polypropylene, cotton, Kenaf, jute, or any combination thereof.

In the aspects where the fiber comprises nylon, it is understood that the fibers can comprise one or more of nylon 6/6 fibers, nylon 6 fibers, nylon 10 fibers, nylon 10/10 fibers, nylon 10/11 fibers, or nylon 11 fibers, and the like. In the aspects where the fiber comprises polyester, it is understood that the polyester fibers can comprise polyethylene terephthalate (PET) fiber, polypropylene terephthalate (PPT) fiber, polybutylene terephthalate (PBT) fiber, polytrimethylene terephthalate (PTT) fiber, or combinations thereof.

In still further aspects, the fiber matrix can comprise various blends of fibers. In some aspects, the fibers present in the fiber matrix can have the same or a different melting point. In certain aspects, the fiber matrix can comprise low-melt fibers and high-melt fibers. It is understood that as used herein, low-melt fibers define fibers having a melting point between about 100° C. and about 180° C. In certain aspects, the melting point of the low-melt fiber is about 110° C., about 120° C., about 130° C., about 140° C., about 150° C., about 160° C., or about 170° C.

In yet other aspects, the low-melt fiber can comprise, for example and without limitation, low-melt polyester, polypropylene, polyethylene, copolyester, copolymer nylons, engineered olefins, conjugate filament-linear low-density polyethylene, acrylics, low-melt nylon, and the like. As one having ordinary skill in the pertinent art will appreciate, if the fiber matrix is heated to thermally bond the fibers, the heating of a low-melt fiber in a disclosed fiber matrix can create globules of low-melt polymer at crossover points where the fibers intersect.

In yet other aspects, the low-melt fibers present in the fiber matrix can comprise a bi-component fiber having a portion of high- or standard-melt material and a portion of low-melt polymer. In such aspects, the bi-component fiber configuration can be, for example and without limitation, islands-in-the-sca, side-by-side, core-sheath, and the like. As one having ordinary skill in the pertinent art will appreciate, bi-component fibers can maintain their original structural integrity while also allowing each fiber to glue itself to adjacent fibers. It is contemplated that any known materials having appropriate melt characteristics can be used to form the bi-component fibers.

It is further understood that both virgin and post-consumer or post-industrial fibers can be used. In the aspects where post-consumer or post-industrial fibers are used, the fibers can be obtained from any textiles known in the art. In certain aspects, the fibers are obtained from post-consumer or post-industrial carpets, carpet tiles, or artificial turfs. According to the various aspects, the fibers can be obtained from various components of a previously manufactured carpet product, for example and without limitation, it can be obtained from a face layer, an adhesive layer, a backing layer, a secondary backing layer, an underlayment, a cushioning material, a reinforcing layer, or a scrim, or any combination thereof. In still further aspects, the fiber used in the fiber matrix can comprise a mixture of virgin and recycled fibers. In some aspects, the recycled fibers can be present in any amount from 0 wt % to 100 wt %, including exemplary values of about 1 wt %, about 5 wt %, about 10 wt %, about 20 wt %, about 30 wt %, about 40 wt %, about 50 wt %, about 60 wt %, about 70 wt %, about 80 wt %, and about 90 wt %. It is further understood that any of the mentioned materials can undergo multiple recycling cycles prior to the use in the disclosed fiber matrix.

In still further aspects, the fibers of the fiber matrix can comprise fibers of any type. In some aspects, the fibers are tape fibers. In still further aspects, the fibers are slit film fibers. In yet other aspects, the fibers are spun fibers. In still further aspects, where the fiber matrix is provided as a fiber batt, the fiber batt can comprise air entangled yarns.

According to certain aspects, the fibers present in the fiber matrix can exhibit a substantially uniform size, including substantially uniform linear density measured in denier units and substantially uniform fiber lengths. However, in alternative aspects, fibers present in the fiber matrix can have non-uniform linear densities and non-uniform fiber lengths. In one aspect, the length of the fibers can range from about one inch to about seven inches.

In still further aspects, the fibers of the fiber matrix can have a denier ranging between about 2 to less than about 500 denier per filament (DPF) and more preferably, a denier ranging from about 4 to about 150 denier per filament (DPF), including exemplary values of about 10 DPF, about 25 DPF, about 50 DPF, about 75 DPF, about 100 DPF, about 125 DPF, and about 150 DPF. In still further aspects, the fibers can have any denier value between any two foregoing denier values. According to one aspect, the nonwoven material of the fiber matrix can include a nonwoven batt comprising fibers that each have a denier ranging from four to 150 DPF.

In still further aspects, the fiber matrix can further comprise at least one additive material distributed therein. For example, the fiber matrix can comprise post-consumer carpet materials. It is understood that the additives can comprise virgin and/or recycled materials. In some aspects, the recycled material can be present in any amount from 0 wt % to 100 wt %, including exemplary values of about 1 wt %, about 5 wt %, about 10 wt %, about 20 wt %, about 30 wt %, about 40 wt %, about 50 wt %, about 60 wt %, about 70 wt %, about 80 wt %, and about 90 wt %.

In further aspects, the fiber matrix can comprise a three-dimensional spun bond material (e.g., COLBACK spun bond from Low and Bonar), three-dimensional knitted fabric, or three-dimensional woven fabric. In further optional aspects, the fiber matrix should be understood to include materials that are pliable and able to absorb a liquid, such as, for example, a melamine sponge.

Figure 2:
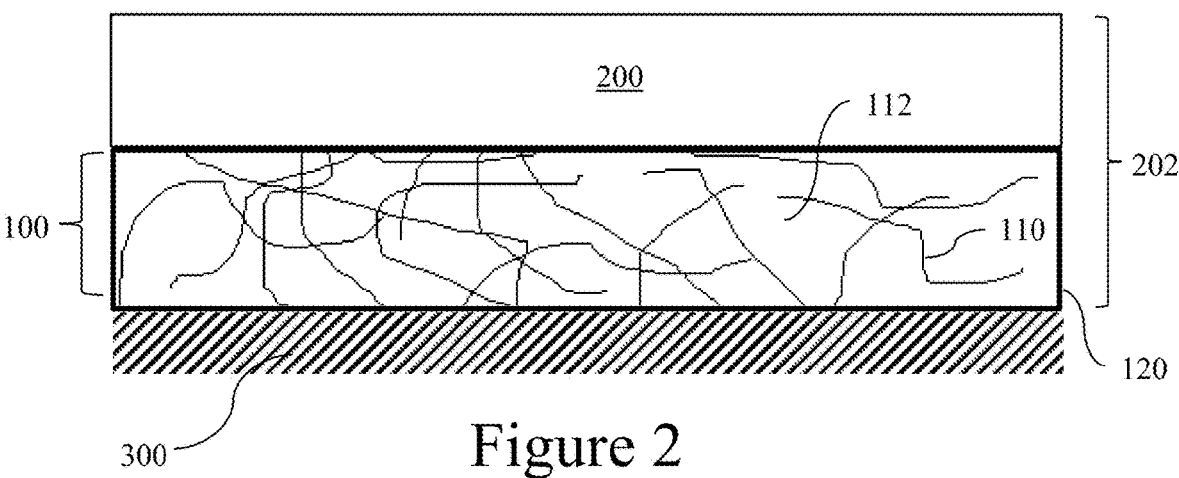
FIG. 2 is another embodiment of a tiled surface using a composite structure as disclosed herein.
Figure 3:
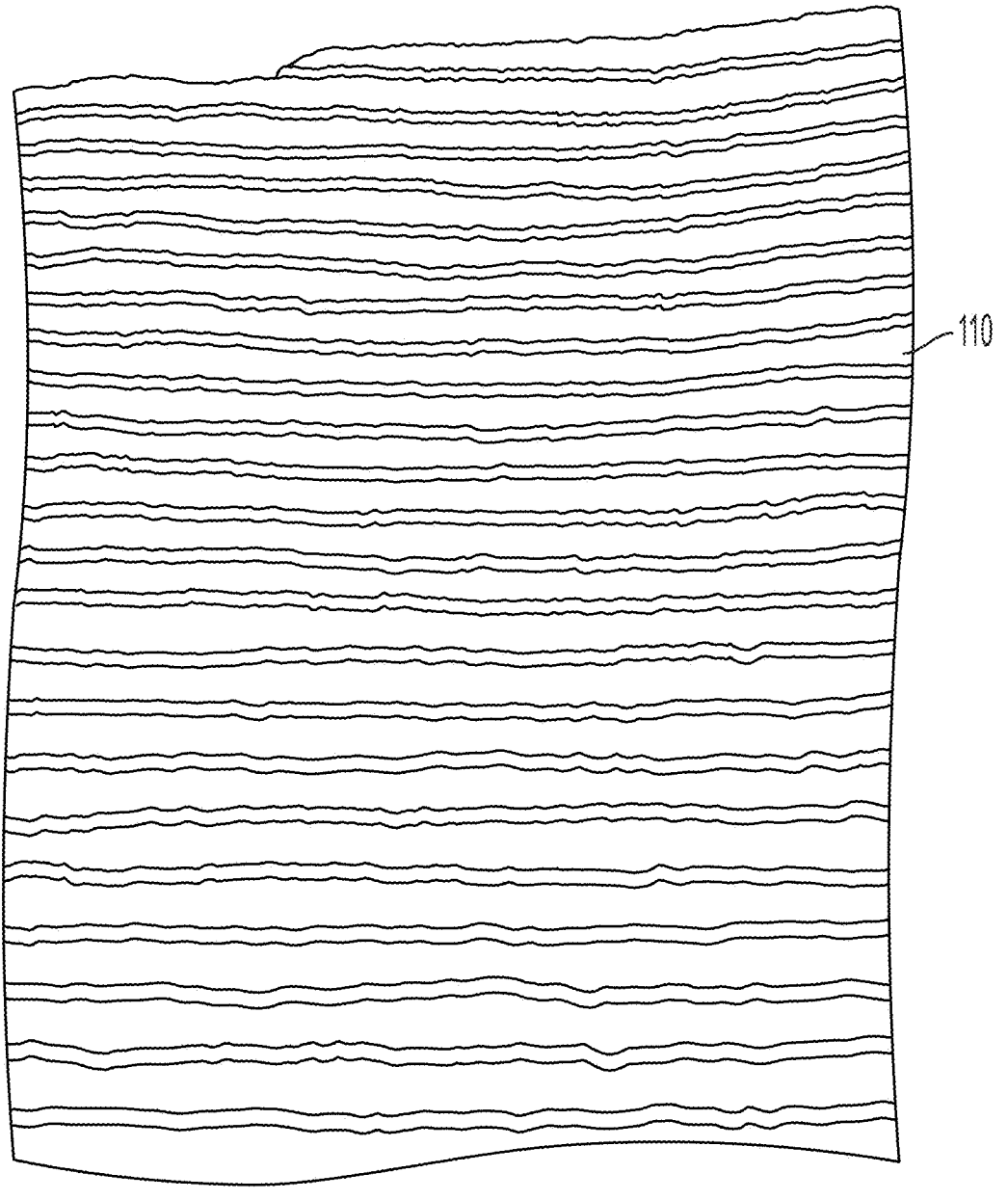
FIG. 3 is an illustration of a fiber matrix for use in the composite structure of FIGS. 1 and 2.
Figure 4:
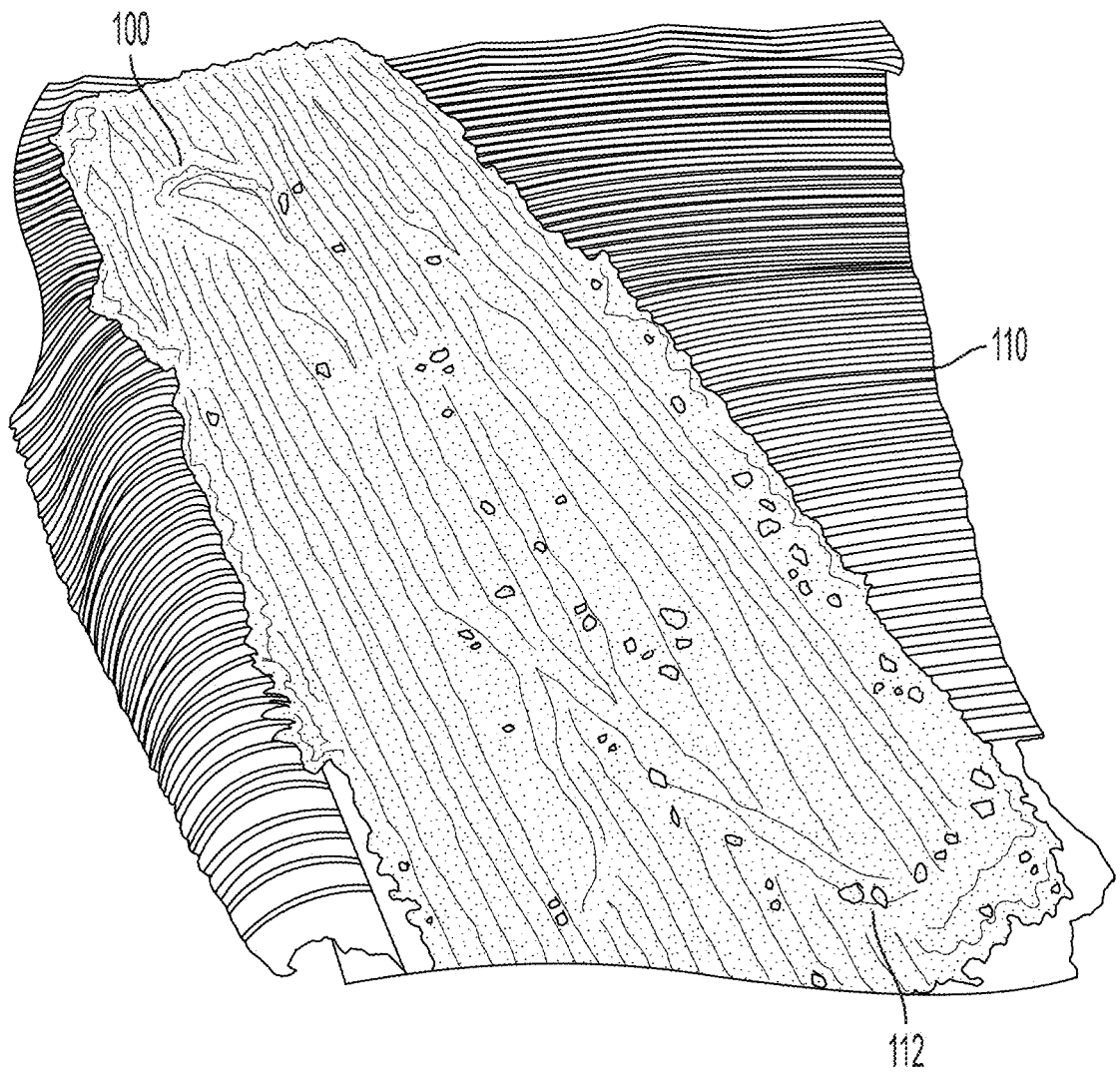
FIG. 4 is an illustration of a composite structure as in FIGS. 1 and 2.

As shown in FIGS. 1-2, the fiber matrix can be impregnated with a water-activated setting material 112. As used herein, the term "impregnated" refers to the distribution of a material within the interstices or void spaces of the fiber matrix. Such distributions ("impregnations") can be substantially uniform/homogenous, random, or have a selected uneven distribution (with some regions having a substantially greater concentration of material than others). As used herein, the term "water-activated setting material" refers to a material that, in a wet state, can be selectively distributed within the fiber matrix and that, in a dry, hardened state (following the wet state), is mechanically and/or chemically bonded to adjoining structures and surfaces. In some exemplary aspects, the water-activated setting material 112 can include, for example, Portland cement, gypsum, or a combination thereof. Other water-activated setting material 112 can comprise one or more polymers. Although exemplary setting materials are disclosed herein, it is contemplated that any suitable setting material can be used. Optionally, the water-activated setting material can be configured to set within 15-90 minutes of application of water.

In some embodiments, a scrim 120 or other outer liner can be used to hold the water-activated setting material 112 generally within, and engaged with, the fiber matrix 110. According to one aspect, the scrim can comprise 20-100 grams per square meter (gsm) polypropylene or polyester or fiberglass. As will be appreciated, the scrim can cover all or portions of the circumferential outer surface of the composite structure while allowing the top and bottom surfaces of the composite structure to engage a tile and an underlying (application) surface as further disclosed herein.

Figure 6:
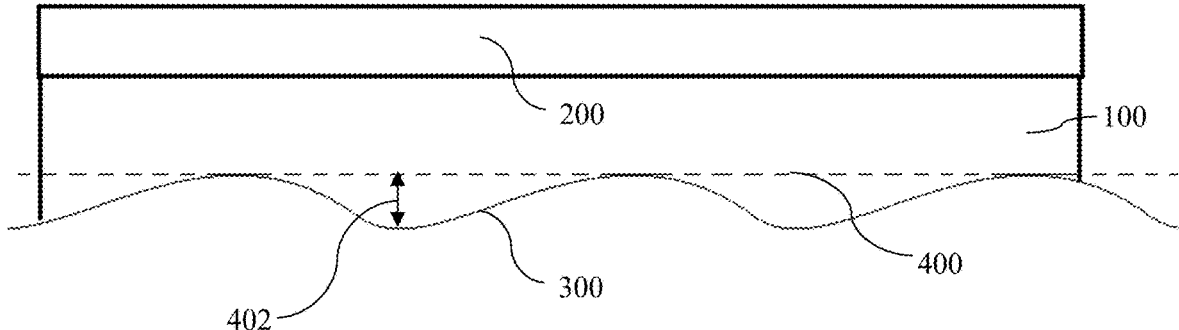
FIG. 6 is a schematic of a composite structure and tile on an application surface having a variable surface profile.
Figure 7:
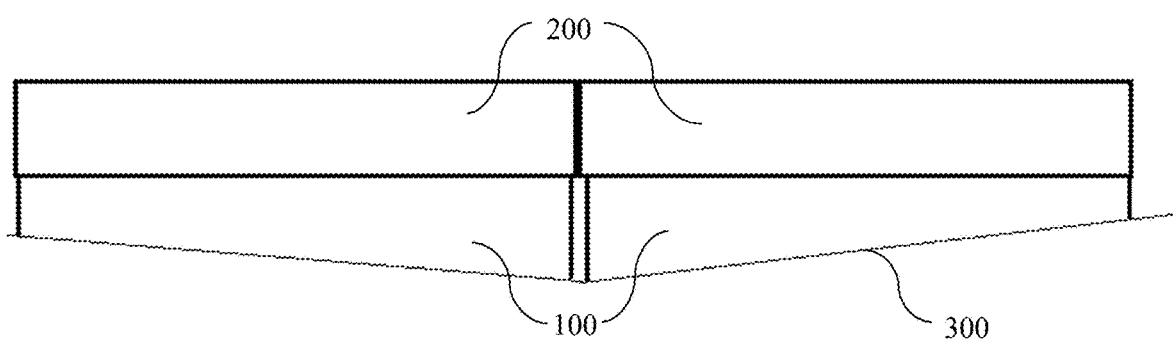
FIG. 7 is a schematic of composite structures and tiles on an application surface having a sloped profile.

The composite structure 100 can be wet (e.g., dipped in or sprayed or otherwise mixed with water) and then compressed between a tile 200 and an application surface 300. According to one aspect, the composite structure can be compressed between the application surface and the tile at a pressure of between about 0.5 and about 2.0 psi. In this way, the composite structure 100 can deform to provide an even top surface 102 and a bottom surface 104 that conforms to the application surface 300 (e.g., a subfloor, which can comprise, for example, concrete, gypsum, wood, backer board, or an isolation membrane). That is, the composite structure 100 can engage an entirety, or substantially an entirety, of the tile's bottom surface. The application surface can have a variable surface (e.g., non-planar) profile. Unevenness (i.e., varying gaps between the tile and the application surface) can be filled with the composite structure. In this way, the entirety of the tile's bottom surface can be supported, thereby minimizing stresses in the tile 200 that could lead to fracture under surface loading. The composite structure 100 can have a thickness between two millimeters and twenty millimeters. Moreover, in some optional aspects, the composite structure can be deformable by up to 50%. That is, at least a portion of the composite structure's thickness can be reduced up to 50% of its uncompressed thickness. In this way, variances between the tile's bottom surface and the application surface can be accommodated for up to the thickness of the composite structure times the deformability percentage. For example, referring to FIG. 6, the application surface 300 can have a variable surface profile that varies, along the length of a tile 200 with respect to a reference plane 400, by a maximum distance 402. The composite structure 100 can optionally be able to accommodate an application surface having a variable surface profile with a maximum distance 402 of at least one millimeter, or at least two millimeters, or at least five millimeters, at least eight millimeters, or up to ten millimeters. That is, the bottom of the composite structure can conform to the shape of the variable surface profile, while the top of the composite structure 100 conforms to the underside of the tile. In this way, installed tiles can have a uniform backing support area, thereby reducing likelihood of stress breakage. In further aspects and with reference to FIG. 7, the deformability of the composite structure can enable the upper surface of the tile to be level while the application surface sloped.

As shown in FIGS. 1-2, the composite structure 100 can be attached to a tile 200 (e.g., a ceramic, porcelain, concrete, natural stone, or quartz tile) to create a tile assembly 202. For example, the tile can be bonded to the composite structure 100 via a hot-melt glue. In some optional aspects, the fiber matrix 102 can be glued to the tile 200, and the fiber matrix 110 can subsequently be impregnated with the water-activated setting material 112. In further embodiments, other types of solvent based glues can bond the tile 200 to the composite structure 100. In yet further embodiments, the fiber may be melt bonded to the ceramic tile via heat lamination. Optionally, in exemplary aspects, the composite structure, including the fiber matrix and the setting mixture, can be attached to the tile prior to delivery of the tile assembly to the installation site (e.g., at a factory or manufacturing facility). In these aspects, it is contemplated that the tile assembly (with the affixed composite structure) can be provided to the installation site in a bag or other carrier system as is known in the art. It is contemplated that attachment of the tile 200 to the composite structure 100 prior to installation can be particularly desirable for tiles that are larger than eight inches by eight inches.

Figure 5:
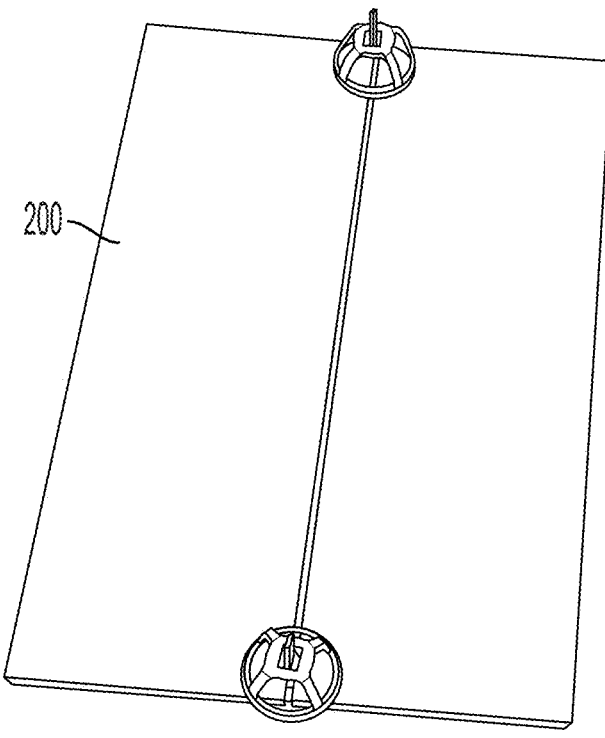
FIG. 5 is an illustration of two tiles installed on a subfloor using composite structures as disclosed herein.

At the installation site, the composite structure of each tile can be wet, and the tile assembly can subsequently be positioned on the application surface. In further embodiments, the composite structure 100 can be wet and placed (or placed and then wet), and the tile 200 can subsequently be placed thereon. In some optional aspects, a plurality of tiles 200 can be positioned on a single composite structure 100. Optionally, the tile assembly 202 can be at least partially submerged in a water container to wet the composite structure. The tile can then be pressed to compress the composite structure between the tile and the application surface. As shown in FIG. 5, a tile level adjusting device, such as a LEVOLUTION tee spacer, can be used to properly position the tiles while the setting material hardens. In some embodiments, the tiles can be height-adjusted with small supports at the corners. According to various aspects, various tile leveling structures, known as lippage control systems, can be used, including SPIN DOCTOR leveling system, LASH clips, YWILLINK plastic flat ceramic leveling system, TOP HOME DEC tile with spacers and clips, and RAIMONDI leveling system. A plurality of such tiles can be placed with one or more composite structures between the tiles and the application surface to create a flooring surface, backsplash, or other tiled surface. It is contemplated that tile level adjusting devices can minimize any unevenness or edge exposure between tiles that can otherwise be caused by spring-back of the composite structure 100.

Optionally, in other aspects, when the fiber matrix comprises a mat, it is contemplated that the mat can be impregnated or saturated with the setting material. In these aspects, the mat, which can be rolled or flat, can be placed on the application surface and then wet with water. The tile can then be placed on the mat. Thus, in these aspects, it is contemplated that the entire tile assembly can be put together at the installation site.

After a plurality of tiles 200 are attached to the application surface 300 with a composite structure 100 therebetween, it is contemplated that one or more of the tiles can be selectively removed. According to one aspect, a process for tile removal can begin with removing the grout from around the tile to be removed. Next, a pry bar can be inserted under an exposed edge of the tile. The pry bar can be used to gently lift up on the exposed edge of the tile. In another aspect, an alternative method for tile removal can include removing the grout from around the tile, striking the tile in the center to break it, and then removing the broken tile pieces. In contrast to conventional tile installations, it is contemplated that the setting mixture of the disclosed composite structure can be easily removed from the application surface through slight scraping and/or brushing. After removal of a selected tile assembly 202, the composite structure 100 of a replacement tile assembly 202 can be wet, and the replacement tile assembly 202 can be secured in place of the removed tile and composite structure.

By implementing the composite structure 100 as disclosed herein, the conventional step of waiting for thinset mortar to cure can be avoided, leading to a shorter wait time before the tiled surface can be grouted. For example, quick setting gypsum can cure more quickly than traditional thinset mortar.

Moreover, the bond between the composite structure 100 and the application surface can have a separation force per square inch that is less twenty pounds per square inch, with the separation force being determined as a bond strength according to Australian Standard 2358 for "Adhesive for Ceramic Wall Tile," which determines a minimum tensile bond strength of the adhesive after seven days. That is, the bond strength between the composite structure and the application surface, according to Australian Standard 2358, can be less than twenty pounds per square inch. This can be substantially less than the bond between the thinset mortar and the tiles. Removing tiles from a tiled surface using conventional thinset mortar typically is an arduous process of chiseling and scraping that often leads to damage of the tiles and the application surface. The composite structure 100 as disclosed herein can be easily removed so that tiles can be replaced with greater case, and a greater chance of success, in comparison to conventional tiled surfaces.

According to some optional aspects, a tile assembly can be placed in water to wet the water-activated setting material (e.g., cement/gypsum) of the composite structure and then placed on the application surface (e.g., the floor). The combination of fiber and cement/gypsum can allow the tile to have an even distribution of backing material to resist breaking under surface loads. Then at the end of the life cycle of the tile it can be more easily removed than thin set placed tiles. Slight scraping and brushing can remove the setting mixture from the floor.

10

Exemplary Aspects

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A composite structure having respective upper and lower surfaces, the composite structure comprising: a fiber matrix; and a water-activated setting material, wherein the fiber matrix is impregnated with the water-activated setting material, wherein the composite structure is deformable prior to setting of the water-activated setting material so that the bottom surface of the composite structure conforms to an underlying application surface.

Aspect 2: The composite structure of aspect 1, wherein the composite structure has an uncompressed thickness between two millimeters and twenty millimeters.

Aspect 3: The composite structure of aspect 1 or aspect 2, wherein the fiber matrix comprises a nonwoven material.

Aspect 4: The composite structure of aspect 3, wherein the nonwoven material comprises a nonwoven batt comprising fibers having a denier ranging from 4 to 150, wherein the fibers are positioned in an open pattern.

Aspect 5: The composite structure of aspect 3, wherein the fiber matrix comprises fibers in a velour pattern.

Aspect 6: The composite structure of aspect 3, wherein the fiber matrix comprises at least one of a melamine sponge, a three-dimensional spunbond, a three-dimensional woven fabric, or a three-dimensional knitted fabric.

Aspect 7: The composite structure of any one of the preceding aspects, wherein the water-activated setting material comprises Portland cement or gypsum.

Aspect 8: The composite structure of any one of the preceding aspects, wherein the water-activated setting material is configured to set within five to ninety minutes of application of water to the water-activated setting material.

Aspect 9: The composite structure of any one of aspects 2-8, wherein the composite structure is deformable by at least 25-50% of its uncompressed thickness.

Aspect 10: A tile assembly comprising: a tile defining a top surface and a bottom surface; and a composite structure as in any of aspects 1-9, wherein the upper surface of the composite structure attaches to the bottom surface of the tile.

Aspect 11: The tile assembly of aspect 10, wherein the tile is a ceramic tile.

Aspect 12: The tile assembly of any one of aspects 7-11,

Aspect 13: The tile assembly of aspect 11, further comprising a hot-melt glue that bonds the tile to the composite structure.

Aspect 14: A method of forming a finished flooring surface comprising: wetting a composite structure comprising: a fiber matrix; and a water-activated setting material, wherein the fiber matrix is impregnated with the water-activated setting material, wherein the composite structure is deformable prior to setting of the water-activated setting material so that the bottom surface of the composite structure conforms to an underlying application surface; and compressing the composite structure between a tile and the underlying application surface.

Aspect 15: The method of aspect 14, wherein the underlying application surface has a variable surface profile, and wherein the composite structure conforms to the variable surface profile of the underlying application surface.

Aspect 16: The method of aspect 14 or aspect 15, wherein the underlying application surface is a subfloor.

Aspect 17: The method of any one of aspects 14-16, wherein the composite structure is attached to the tile prior to wetting of the composite structure.

Aspect 18: The method of any one of aspects 14-16, wherein the composite structure is not attached to the tile prior to wetting of the composite structure, and wherein the method further comprises compressing the wet composite structure between the tile and the underlying application surface prior to setting of the water-activated setting material of the composite structure.

Aspect 19: The method of any one of aspects 14-18, further comprising: allowing the water-activated setting material of the composite structure to set; detaching the composite structure from the underlying application surface; wetting a replacement composite structure comprising: a second fiber matrix; and a second water-activated setting material, wherein the second fiber matrix is impregnated with the second water-activated setting material, wherein the replacement composite structure is deformable prior to setting of the second water-activated setting material so that the bottom surface of the replacement composite structure conforms to the underlying application surface; and compressing the replacement composite structure between the underlying application surface and a second tile.

Aspect 20: The method of any one of aspects 14-19, wherein, after setting, the composite structure is attached to the underlying application surface by a bond having a separation force per square inch that is less than twenty pounds of force per square inch.

Aspect 21: A method of forming a finished flooring surface comprising: wetting the composite structure of the tile assembly as in any of aspects 10-12; and pressing the tile assembly against an underlying application surface.

Aspect 22: The method of aspect 21, wherein the application surface has a variable surface profile, and wherein the composite structure conforms to the variable surface profile of the underlying application surface.

Aspect 23: The method of aspect 21 or aspect 22, wherein the underlying application surface is a subfloor.

Aspect 24: The method of any one of aspects 21-23, wherein the composite structure is attached to the tile prior to wetting of the composite structure.

Aspect 25: The method of any one of aspects 21-23, wherein the composite structure is not attached to the tile prior to wetting of the composite structure, and wherein the method further comprises compressing the wet composite structure between the tile of the tile assembly and the underlying application surface prior to setting of the water-activated setting material of the composite structure.

Aspect 26: The method of any one of aspects 21-25, further comprising: allowing the water-activated setting material of the composite structure to set; detach-ing the tile assembly from the underlying application surface; wetting a composite structure of a replacement tile assembly as in any of aspects 10-12; and securing the replacement tile assembly to the underlying application surface.

Aspect 27: A flooring surface created according to the method of any one of aspects 21-26.

Aspect 28: The flooring surface of aspect 27, wherein the tile assembly is attached to the underlying application surface by a bond having a separation force per square inch that is less than twenty pounds of force per square inch.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A composite structure having respective upper and lower surfaces, the composite structure comprising:
   a fiber matrix;
   a water-activated setting material, wherein the fiber matrix is impregnated with the water-activated setting material; and
   a scrim that holds the water-activated setting material in engagement with the fiber matrix,
   wherein the composite structure is deformable prior to setting of the water-activated setting material so that the bottom surface of the composite structure conforms to an underlying application surface.

2. The composite structure of claim 1, wherein the composite structure has an uncompressed thickness between two millimeters and twenty millimeters.

3. The composite structure of claim 1, wherein the fiber matrix comprises a nonwoven material.

4. The composite structure of claim 3, wherein the nonwoven material comprises a nonwoven batt comprising fibers having a denier ranging from 4 to 150, wherein the fibers are positioned in an open pattern.

5. The composite structure of claim 3, wherein the fiber matrix comprises fibers in a velour pattern.

6. The composite structure of claim 3, wherein the fiber matrix comprises at least one of a melamine sponge, a three-dimensional spunbond, a three-dimensional woven fabric, or a three-dimensional knitted fabric.

7. The composite structure of claim 1, wherein the water-activated setting material comprises Portland cement or gypsum.

8. The composite structure of claim 1, wherein the water-activated setting material is configured to set within five to ninety minutes of application of water to the water-activated setting material.

9. The composite structure of claim 1, wherein the composite structure has an uncompressed thickness, and wherein the composite structure is deformable by at least 25-50% of its uncompressed thickness.

10. A tile assembly comprising:
    a tile defining a top surface and a bottom surface, wherein the tile is a ceramic tile, a porcelain tile, a concrete tile, a natural stone tile, or a quartz tile; and
    a composite structure comprising:
       a fiber matrix;
       a water-activated setting material, wherein the fiber matrix is impregnated with the water-activated setting material,
       wherein the composite structure is deformable prior to setting of the water-activated setting material so that the bottom surface of the composite structure conforms to an underlying application surface, and wherein, prior to wetting of the water-activated setting material, the tile is bonded to the water-activated setting material of the composite structure.

11. The tile assembly of claim 10, wherein the tile is a ceramic tile.

12. The tile assembly of claim 10, wherein the tile is bonded to the composite structure.

13. The tile assembly of claim 12, further comprising a hot-melt glue that bonds the tile to the composite structure.

14. A method of forming a finished flooring surface comprising:

wetting a composite structure comprising:
  a fiber matrix;
  a water-activated setting material, wherein the fiber matrix is impregnated with the water-activated setting material; and
  a scrim that holds the water-activated setting material in engagement with the fiber matrix,
  wherein the composite structure is deformable prior to setting of the water-activated setting material so that the bottom surface of the composite structure conforms to an underlying application surface; and
compressing the composite structure between a tile and the underlying application surface.

15. The method of claim 14, wherein the underlying application surface has a variable surface profile, and wherein the composite structure conforms to the variable surface profile of the underlying application surface.

16. The method of claim 14, wherein the underlying application surface is a subfloor.

17. The method of claim 14, wherein the composite structure is attached to the tile prior to wetting of the composite structure.

18. The method of claim 14, wherein the composite structure is not attached to the tile prior to wetting of the composite structure, and wherein the method further comprises compressing the wet composite structure between the tile and the underlying application surface prior to setting of the water-activated setting material of the composite structure.

19. The method of claim 14, further comprising:

allowing the water-activated setting material of the composite structure to set;

detaching the composite structure from the underlying application surface;

wetting a replacement composite structure comprising:
  a second fiber matrix; and
  a second water-activated setting material, wherein the second fiber matrix is impregnated with the second water-activated setting material,
  wherein the replacement composite structure is deformable prior to setting of the second water-activated setting material so that the bottom surface of the replacement composite structure conforms to the underlying application surface; and
compressing the replacement composite structure between the underlying application surface and a second tile.

20. The method of claim 14, wherein, after setting, the composite structure is attached to the underlying application surface by a bond having a separation force per square inch that is less than twenty pounds of force per square inch.

* * * * *